United States Patent
Lee (10) Patent No.: US 10,049,369 B2
(45) Date of Patent: Aug. 14, 2018

(54) GROUP TARGETING SYSTEM AND METHOD FOR INTERNET SERVICE OR ADVERTISEMENT

(71) Applicant: NHN Business Platform Corporation, Seongnam-si (KR)

(72) Inventor: Keonsu Lee, Seongnam-si (KR)

(73) Assignee: NAVER CORPORATION, Soengnam-si (KR)

(*) Notice: Subject to any disclaimer, the term of this patent is extended or adjusted under 35 U.S.C. 154(b) by 372 days.

(21) Appl. No.: 13/627,339

(22) Filed: Sep. 26, 2012

(65) Prior Publication Data
US 2013/0080250 A1    Mar. 28, 2013

(30) Foreign Application Priority Data
Sep. 27, 2011    (KR) .................. 10-2011-0097473

(51) Int. Cl.
*G06Q 30/02*    (2012.01)
*G06F 15/173*    (2006.01)

(52) U.S. Cl.
CPC .................... *G06Q 30/02* (2013.01)

(58) Field of Classification Search
None
See application file for complete search history.

(56) References Cited

U.S. PATENT DOCUMENTS

| | | | |
|---|---|---|---|
| 6,674,745 B1 * | 1/2004 | Schuster et al. | 370/352 |
| 7,376,714 B1 * | 5/2008 | Gerken | 709/219 |
| 7,451,130 B2 * | 11/2008 | Gupta et al. | |
| 7,752,210 B2 * | 7/2010 | Riise et al. | 707/755 |
| 8,694,597 B1 * | 4/2014 | Raj et al. | 709/213 |
| 2007/0233671 A1 * | 10/2007 | Oztekin | G06F 17/30867 |
| 2008/0227473 A1 * | 9/2008 | Haney | 455/457 |
| 2010/0131353 A1 * | 5/2010 | Ha | G06O 30/02 705/14.42 |
| 2011/0015992 A1 * | 1/2011 | Liffiton | G06Q 30/02 705/14.46 |
| 2011/0087550 A1 * | 4/2011 | Fordyce, III | G06Q 30/02 705/14.65 |
| 2011/0289190 A1 * | 11/2011 | Chamberlain et al. | 709/217 |
| 2012/0323677 A1 * | 12/2012 | Bottou et al. | 705/14.45 |

FOREIGN PATENT DOCUMENTS

| | | |
|---|---|---|
| JP | 2004-078291 | 3/2004 |
| JP | 2005-522098 | 7/2005 |
| JP | 2010117861 | 5/2010 |
| JP | 2010-525479 | 7/2010 |
| KR | 10-2008-0091410 | 10/2008 |
| WO | WO 03084159 | 10/2003 |
| WO | WO 2008133404 | 11/2008 |

OTHER PUBLICATIONS

Office Action issued in corresponding Japanese patent application No. 2012-211902, dated Mar. 15, 2016.

* cited by examiner

*Primary Examiner* — John Van Bramer
(74) *Attorney, Agent, or Firm* — Greer Burns & Crain, Ltd.

(57) ABSTRACT

A group targeting system may include an Internet protocol (IP) extraction unit to extract a group IP using a number of accesses per unit time with respect to an IP, and a characteristic determination unit to determine characteristics of a group that uses the group IP through the group IP. The system includes also a targeting unit to provide a targeted service or a targeted advertisement to the group according to the characteristics of the group.

14 Claims, 5 Drawing Sheets

FIG. 5

GROUP TARGETING SYSTEM AND METHOD FOR INTERNET SERVICE OR ADVERTISEMENT

CROSS-REFERENCE TO RELATED APPLICATION

This application claims priority from and the benefit of Korean Patent Application No. 10-2011-0097473, filed on Sep. 27, 2011, which is hereby incorporated by reference for all purposes as if fully set forth herein.

BACKGROUND OF THE INVENTION

Field of the Invention

Exemplary embodiments of the present invention relate to a group targeted system and method performing targeted internet services or targeted internet advertisement based on group characteristics using a range Internet protocol (IP).

Discussion of the Background

An Internet protocol (IP) address refers to a unique address for distinction between a transmitter and a receiver in communication using transmission control protocol/internet protocol (TCP/IP). That is, the IP address refers to a unique address assigned to all networks connected to the Internet and to computers connected to the networks.

The IP address is assigned by an Internet service providers which provide Internet connection services. However, actually, the IP address is assigned to a final user under the cooperation and management of a Korea Network Information Center (KRNIC) and further of an Asian Pacific Network Information Center (APNIC). That is, ISPs obtain allocations of IP addresses from a local Internet Registry (LIR) or National Internet Registry (NIR), or from their appropriate Regional Internet Registry (RIR). The North America RIR is American Registry for Internet Numbers (ARIN)

Korean Patent Laid-open No. 10-2008-0091410 (laid open on Oct. 13, 2008) discloses a local targeting technology providing local information of a corresponding range IP by determining a region of the range IP that includes a user IP address. However, the related-art local targeting technology only provides a weather forecasting service and business advertisements of a region which includes the user, by recognizing address units of an administrative district through IP addresses of individuals. The exemplary embodiments suggest a group targeting technology which extracts a group IP through a range IP and recognizes specific characteristics of a group using the group IP.

The above information disclosed in this Background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide a group targeting system and a method to extract a group Internet protocol (IP) in a range IP.

Exemplary embodiments of the present invention also provide a group targeting system and method to accurately recognize a location of a group IP using a range IP.

Exemplary embodiments of the present invention also provide a group targeting system and method to recognize characteristics of a group, such as a scale, a business type, a matter of interest, and the like, using a range IP.

Additional features of the invention will be set forth in the description which follows, and in part will be apparent from the description, or may be learned by practice of the invention.

An exemplary embodiment of the present invention discloses a group targeting system including an Internet protocol (IP) extraction unit to extract a group IP using a number of accesses per unit time with respect to an IP, and a characteristic determination unit to determine characteristics of a group that uses the group IP through the group IP.

An exemplary embodiment of the present invention also discloses a group targeting method in a group targeting system that includes extracting a group IP using a number of accesses per unit time with respect to an IP, and determining characteristics of a group that uses the group IP through the group IP.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the is accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

It will be understood that when an element is referred to as being "connected to" another element, it can be directly connected to the other element, or intervening elements may be present. In contrast, when an element is referred to as being "directly on" or "directly connected to" another element, there are no intervening elements present. It will be also understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
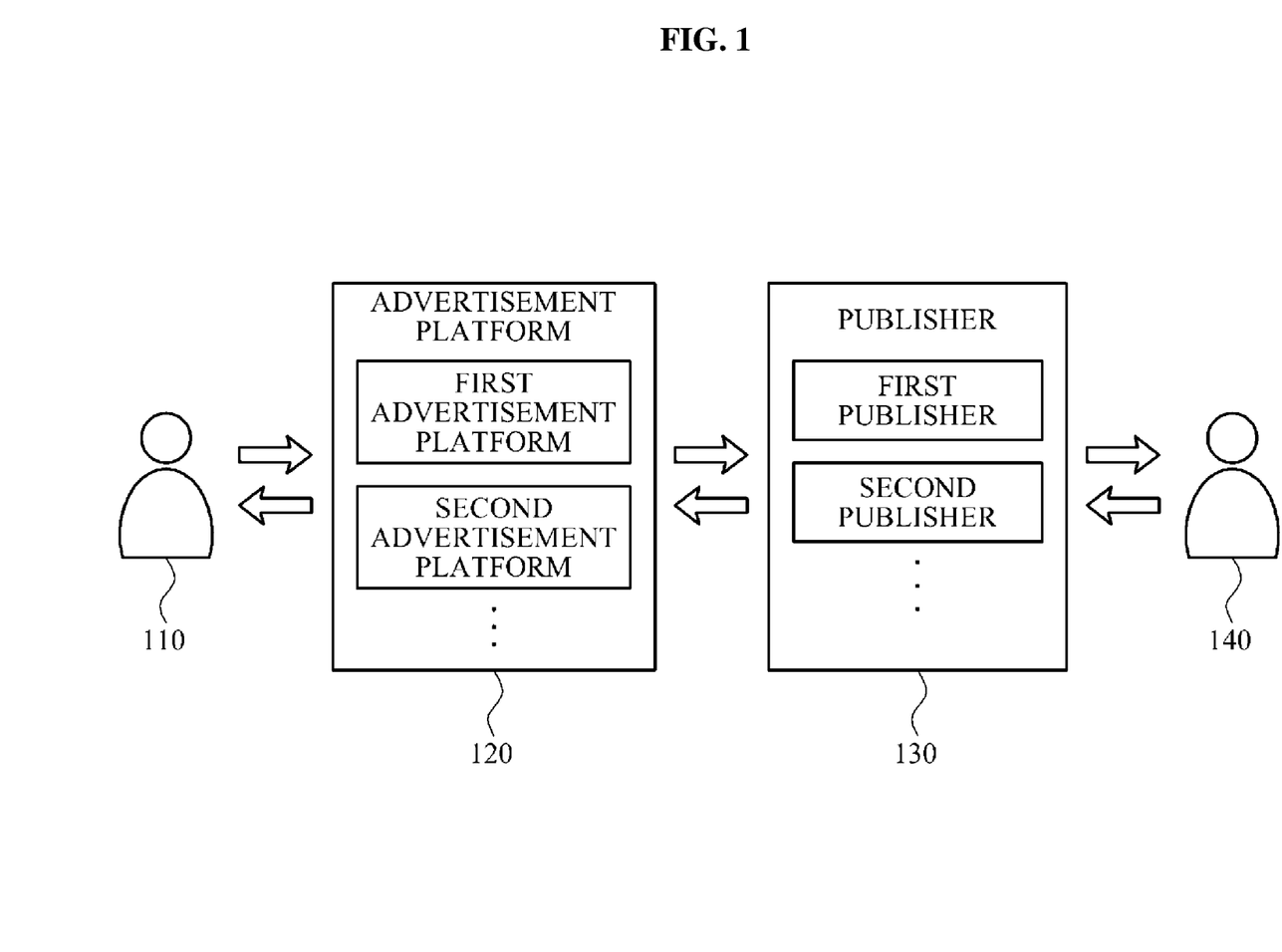
FIG. 1 is a diagram illustrating relations among an advertiser, an advertisement platform, a publisher, and a user, according to an exemplary embodiment of the present invention.

FIG. 1 is a diagram illustrating relations among an advertiser, an advertisement platform, a publisher, and a user, according to an exemplary embodiment of the present invention.

That is, FIG. 1 shows an advertiser 110, an advertisement platform 120, a publisher 130, and a user 140. The advertiser 110 and the user 140 may actually refer to a terminal such as a personal computer (PC) and a smart phone used by the advertiser 110 and the user 140. In FIG. 1, arrows may indicate data received and transmitted through a wired or wireless network among the terminal used by the advertiser 110, the advertisement platform 120, the publisher 130, and the terminal used by the user 140.

The advertisement platform 120 may perform bidding of an advertisement, is matching between an advertisement and a search term, arrangement of advertisements or advertisers, provision of an advertisement to the publisher 130, and charging for advertisement exposure. General technical matters of the advertisement platform 120, such as matters about a search advertisement and a banner advertisement provided through the Internet, that may be understood from related arts will not be explained herein.

First of all, a term "publisher" used herein may be replaced with a term "site." However, use of the term "site" does not mean exclusion of practicability of the embodiments of the present invention in an environment other than an access to a website from a general PC, such as an application screen executed in a mobile terminal. Conversely, the term "site" may be compatibly used with a publishing site or the publisher. That is, each site may correspond to individual publishers shown in the publisher 130. The term "site" may include all types of websites provided to users through a wired or wireless network, in which exposure of advertisements is allowed, or include a single webpage constituting a website.

Here, a term "exposure" of advertisements may be interpreted to include provision of commercial contents including text, images, sound, video, hyperlinks, and the like related to an advertiser to visitors of a corresponding site, through the site, that is, publisher. A term "selection" with respect to the exposed advertisement may refer to occurrence of a situation intended by the advertiser through provision of the commercial contents, the situation caused when a user, that is, the site visitor, generates a reaction such as a mouse click with respect to the commercial contents such as text and images. For example, the situation intended by the advertiser may be an exposure of a page related to the advertiser to the user who selected the advertisement.

The publisher 130 may provide its own site to the user 140. Also, the publisher 130 may provide the user 140 with pages included in the site through the site, or provide the user 140 with a search result related to a search term through the search term being input. Here, the publisher 130 may receive advertisements to be exposed through the pages from the advertisement platform 120 and provide the advertisements to the user 140. Also, the publisher 130 may forward the search term input by the user 140 to the advertisement platform 120, and receive the advertisement related to the search term from the advertisement platform 120 and provide the advertisement to the user 140 as the search result.

The publisher 130 may provide a path, such as a screen, for direct provision of an advertisement to the user 140. In general online environments, advertisements may be provided through a website. A plurality of individual advertisement platforms, for example a first advertisement platform, a second advertisement platform, and so forth included in the advertisement platform 120 may expose advertisements through at least one of a plurality of individual publishers, for example a first publisher, a second publisher, and so forth included in the publisher 130. Each of the plurality of individual publishers may provide at least one of various services including exposure of the advertisement, total search, keyword search, blog service, and the like which can be provided through the wired or wireless network, to the user 140 through at least one site.

Basically, the user 140 may perform searching by inputting a search term to the publisher 130. In this case, the publisher 130 may be a search engine providing the user 140 with a search result related to the search term, or a subject displaying to the user 140 a service page that provides a search result corresponding to an input search term.

Figure 2:
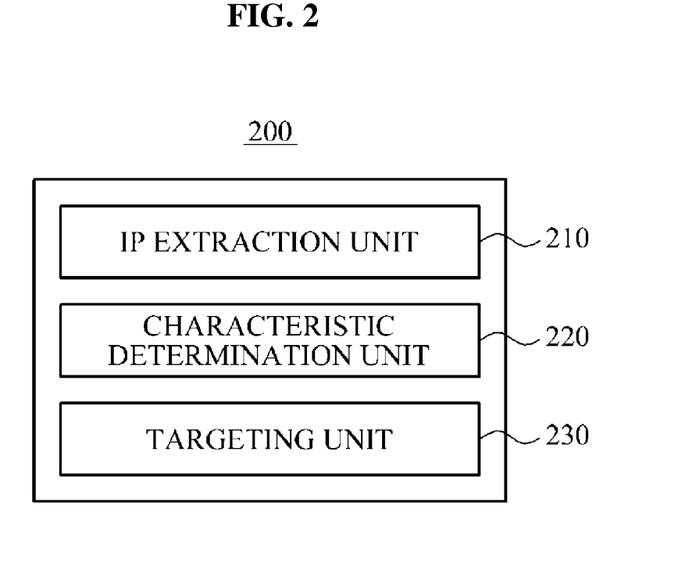
FIG. 2 is a block diagram illustrating an inner structure of a group targeting system that extracts a group Internet protocol (IP) from a range IP and performs targeting with respect to a corresponding group, according to an exemplary embodiment of the present invention.

FIG. 2 is a block diagram illustrating an inner structure of a group targeting system 200 that extracts a group Internet protocol (IP) from a range IP and performs targeting with respect to a corresponding group, according to an embodiment of the present invention. The group targeting system 200 may be included in the advertisement platform 120 or the publisher 130 described with reference to FIG. 1. Alternatively, as a separate system from the advertisement platform 120 and the publisher 130, the group targeting system 200 may operate in association with the advertisement platform 120 or the publisher 130. In addition, although the group targeting system 200 is provided as the separate system, part of structures of the group targeting system 200 may operate residing in the advertisement platform 120 or the publisher 130 based on a system design or a service type.

As shown in FIG. 2, the group targeting system 200 may include an IP extraction unit 210, a characteristic determination unit 220, and a targeting unit 230. Depending on conditions, at least two of the foregoing structures may be integrated or at least one structure may be omitted from the group targeting system 200.

The IP extraction unit 210 may extract a group IP using a number of accesses per unit time with respect to a range IP. In general, a group uses a personal IP in an individual PC, and accesses to the Internet by performing address translation to a public IP commonly assigned through network address translation. That is, the group IP may be extracted from the range IP using the number of accesses per unit time. In the present embodiment, the number of accesses per unit time may be counted using browser cookie information. The browser cookie information may refer to a cookie assigned for identifying a web browser of the individual PC in access. The IP extraction unit 210 may calculate the number of accesses per unit time based on a number of browser cookies, and extract the group IP as an IP of which the number of accesses per unit time is greater than or equal to a predetermined number. Furthermore, in an IP address structure including four sections, the IP extraction unit 210 may determine, as the group IP, an IP is range including identical addresses except a digit of a fourth section. For example, an IP range including IP addresses in the form of "215.235.35.xxx" may be considered as the same group.

The characteristic determination unit 220 may determine characteristics of a group that uses the group IP through the group IP. In the present embodiment, the characteristic determination unit 220 may determine at least one characteristic selected from a scale, a location, a business name, and a business type, using the group IP.

Figure 3:
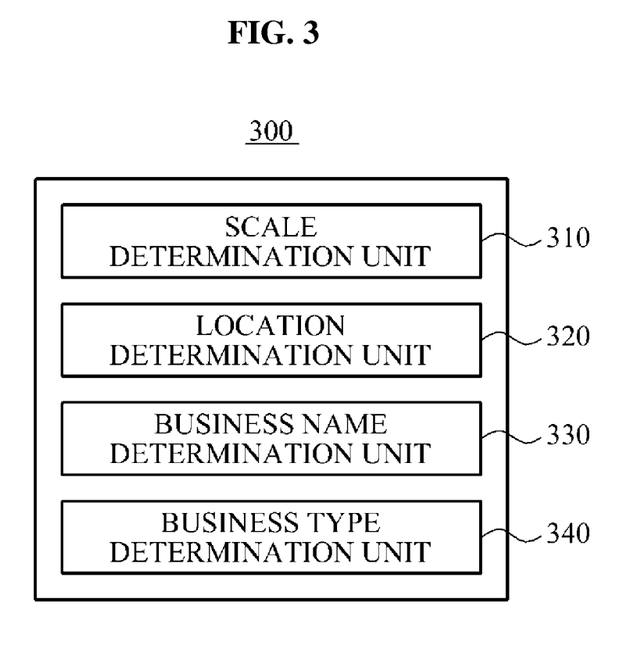
FIG. 3 is a block diagram illustrating a structure determining characteristics of an extracted group, according to an exemplary embodiment of the present invention.

A structure for determining characteristics of a group will be described in detail with reference to FIG. 3. FIG. 3 is a block diagram illustrating a structure determining characteristics of an extracted group, according to an embodiment of the present invention. As shown in FIG. 3, a characteristic determination unit 300 may include at least one of a scale determination unit 310, a location determination unit 320, a business name determination unit 330, and a business type determination unit 340. Depending on embodiments, the characteristic determination unit 300 may be provided solely, or a plurality of characteristic determination units 300 may be connected.

The scale determination unit 310 may determine a scale of a group with reference to at least one of a number of accesses per unit time and an access time slot of the group IP. According to the number of accesses per unit time and the access time slot of the group IP, whether the IP corresponds to a home or a group and, furthermore, whether the group has a large scale or a small scale when the IP corresponds to the group may be determined. For example, presuming that the IP corresponds to the group such as a company when the number of accesses is concentrated on a time slot from 9 a.m. to 6 p.m., the scale determination unit 310 may determine whether the IP corresponds to the home or the group based on the time slot in which accesses of the group IP are concentrated. As another example, presuming that the number of is accesses per unit time is proportional to a number of employees, the scale determination unit 310 may calculate the number of accesses per unit time based on a number of browser cookies, and determine the scale of the group based on the number of accesses per unit time. For example, when the number of browser cookies for a predetermined time duration is greater than 300 with respect to the group IP, the IP may be determined as a large enterprise. The IP may be determined as a small and medium enterprise when the number of browser cookies is not greater than 300, or as a home when the number of browser cookies is further smaller than a reference value of the small and medium enterprise.

The location determination unit 320 may determine a location of the group that uses the group IP. For example, the location determination unit 320 may determine a region corresponding to the group IP as the location of the group, using a database (DB) storing IP ranges and local units being mapped. The DB, as a DB system structured by an Internet provider, may provide data mapped with local units of the administrative district, such as a town unit, a city/county/ward unit, a megalopolis unit, and the like. Using the DB, a region represented by the group IP may be determined. However, since mapping data between IPs and local units is limited to the local units of the administrative district, accurate identification of the location of the group is difficult. As another example, the location determination unit 320 may determine the location corresponding to the group IP more accurately, using location information of a mobile device used by a user belonging to the group. As one method for determining the accurate location of the group, when a user who has logged in through the group IP based on a log-in cookie of the user logs in through the mobile device within a predetermine time, the location determination unit 320 may determine the location information of the mobile device as the location of the group. That is, when the user uses a service utilizing global positioning is system (GPS) information of the user, by logging in in a mobile environment in temporal relationship with the log-in cookie of the user who has logged in through the group IP, a corresponding GPS coordinate may be determined as the location of the group. As another method, the location determination unit 320 may identify a mobile device that gained an access through the group IP, thereby determining the location information of the mobile device as the location of the group. That is, access information of the same IP is used. When the mobile device is identified among IP accessed devices, for example using http header information, and when the service utilizing the location information of the user, such as a search service, is used through an access to a wireless fidelity (WI-FI) network from the mobile device, location information obtained in this process may be determined as the location of the group.

The business name determination unit 330 may determine a business name of the group that uses the group IP. For example, the business name determination unit 330 may use a DB storing IP ranges and business names being mapped, in determining a business name corresponding to the group IP as the business name of the group. For example, the business name determination unit 330 may reference an owner of the group IP by inquiring of Korea network information center (KRNIC) who provides mapping data between IPs and business names, thereby determining the business name of the group. Alternatively, the business name determination unit 330 may consider the scale of the group determined by the scale determination unit 310 to determine the business name of the group. In case of a group including 10 thousands of counted browser cookies, presuming that one person uses two terminals, for example a PC and a smart phone, the group is estimated to have at least 5 thousands of employees. Therefore, the business name may be predicted by referencing companies having at least 5 thousands of employees in a neighborhood region corresponding to the IP. As another example, the business name determination unit 330 may determine the business name of the group, based on the location information obtained by the location determination unit 320, that is, the location information of the mobile device used by the user belonging to the group. That is, the business name determination unit 330 may determine the business name from a local address corresponding to longitude and latitude values of the determined location information, using a map DB storing the longitude and latitude values and local addresses being mapped. Also, when the user uses the location based service using GPS by accessing to the WI-FI network through a mobile device in the Suwon workplace of Samsung Electronics, the business name determination unit 330 may find an address of the Suwon workplace which is most approximate to a corresponding GPS value or find a business name called Suwon workplace of Samsung Electronics from the map DB. In the present embodiment, a DB may be structured by generating a mapping data storing the business names determined by the business name determination unit 330 and the group IPs being mapped. Here, the DB may store and maintain the mapping data in the form of a pair of IP address and local address of a region including the business name. The DB may be shared by the advertisement platform 120 described with reference to FIG. 1. Also, the DB may be periodically updated in consideration of an IP change and up-to-datedness of the group.

The business type determination unit 340 may determine a business type of the group using a popular search term searched by the user of the group IP. That is, the business type determination unit 340 may extract a popular search term set referenced in a particular IP, extract all popular search term sets referenced in all IPs, and determine the business type based on characteristics or a category of a frequent search terms referenced in only particular IP proxy. Here, popular search terms referenced by all users, that is, commonly used search terms are is excluded from the popular search terms referenced in the particular IP. In this state, if a search term set remains which has a high frequency in an IP proxy of a corresponding group but a low frequency as a whole, keywords corresponding to the search term set may be extracted and a category of the keywords may be determined. Accordingly, the business type of the group may be predicted.

The above-described characteristic determination unit 220 may determine at least one of the scale, the location, the business name, and the business type of the group using a corresponding group IP, for targeting of the group IP.

Referring back to FIG. 2, the targeting unit 230 may perform targeting with respect to the group IP, using at least one of the scale, the location, the business name, and the business type of the group as a targeting factor of an advertisement related to the group. For example, the targeting unit 230 may perform advertisement targeting in consideration of whether the group using the group IP corresponds to a home or a group or whether the group has a large scale or a small scale. As another example, the targeting unit 230 may provide an advertisement targeted to the popular search term searched by a user of the group IP or a user of the region including the group. In detail, the targeting unit 230 may perform targeting per unit level of the region including the group. That is, the targeting unit 230 may extract the popular search term of a corresponding region per local unit selected from the town unit, the city/county/ward unit, the megalopolis unit. Here, nationwide popular search terms are excluded, and then a keyword having a high frequency in the corresponding region but a low frequency nationwide may be extracted as the popular search term set. Therefore, the advertisement targeted to the popular search term may be provided. In addition, the targeting unit 230 may provide the advertisement targeted to a group interested keyword, which refers to a keyword having a high frequency is locally but a low frequency nationwide, extracted per group unit by the business type determination unit 340. Accordingly, the targeting unit 230 may perform targeting with respect to the group, in consideration of at least one characteristic among the scale, the location, the business name, and the business type.

The group targeting system 200 may provide a list of the group IPs and group characteristics per the group IP to the advertisement platform 120 explained with reference to FIG. 1. Therefore, the advertisement platform 120 may enable advertisers to perform bidding per individual group, using the group extracted in the IP range as a bidding option factor of the advertisers. For example, the advertisement may be provided by selling a keyword formed by combining the region and the business name of the group to local advertisers. In addition, the advertisement platform 120 may exclude the group IP extracted in the IP range, from objects of invalid click processing with respect to the advertisement. That is, the advertisement platform 120 may apply the IP determined to be the group by the group targeting system 200, as an excluded object of invalid click. Therefore, even when a large number of clicks occur in the group IP, the clicks may be processed as valid clicks. In addition, the group targeting system 200 may provide IP information including the list of the group IPs and the group characteristics per the group IP to the advertisers through the advertisement platform 120, to induce the advertisers not to exclude the group IP from objects of advertising.

Figure 4:
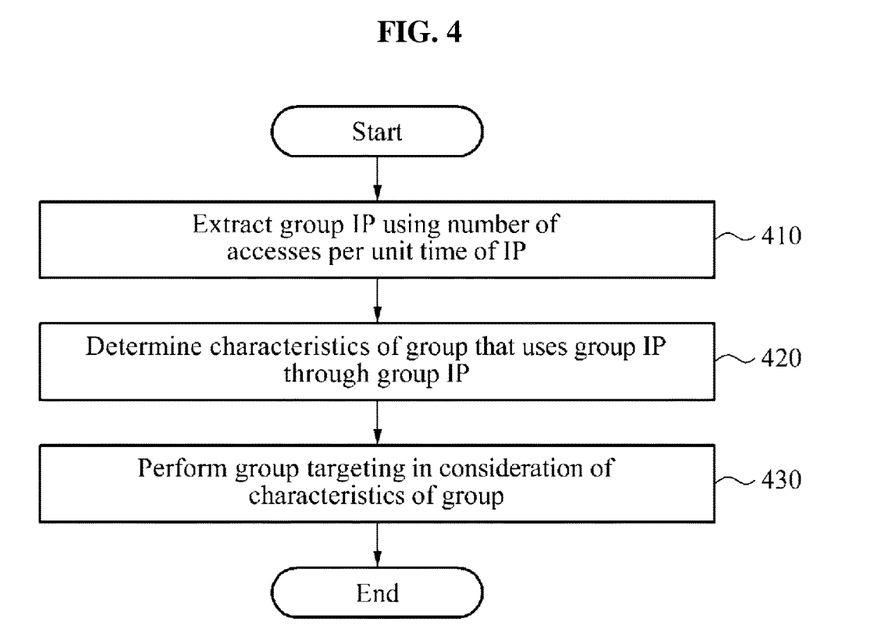
FIG. 4 is a flowchart illustrating a group targeting method that extracts a group IP from a range IP and performs targeting with respect to a corresponding group, according to an exemplary embodiment of the present invention.

FIG. 4 is a flowchart illustrating a group targeting method that extracts a group IP from a range IP and performs targeting with respect to a corresponding group, according to an embodiment of the present invention. The group targeting method of the present embodiment may be performed by the group targeting system 200 explained with reference to FIG. 2.

In operation 410, the group targeting system 200 may extract a group IP from a is range IP using a number of accesses per unit time. That is, the group targeting system 200 may calculate the number of accesses per unit time based on a number of browser cookies, and extract the group IP as an IP of which the number of accesses per unit time is greater than or equal to a predetermined number. Furthermore, in an IP address structure including four sections, the group targeting system 200 may determine, as the group IP, IP ranges having identical addresses except a digit of a fourth section.

Figure 5:
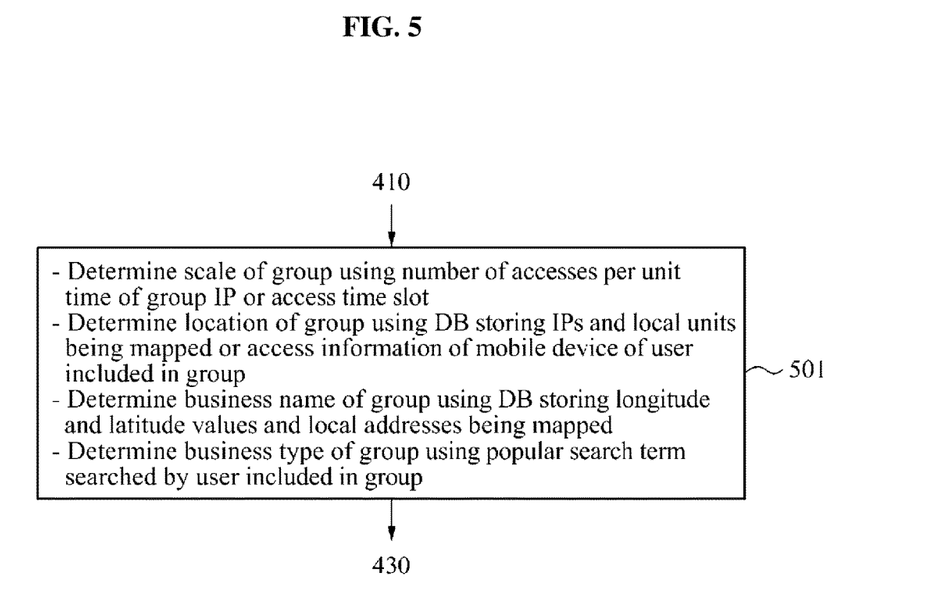
FIG. 5 is a diagram illustrating a method of determining characteristics of an extracted group, according to an exemplary embodiment of the present invention.

In operation 420, the group targeting system 200 may determine at least one characteristic among the scale, the location, the business name, and the business type of the group using a corresponding group IP, for targeting of the group IP. Referring to FIG. 5, first, the group targeting system 200 may determine the scale of the group by referencing at least one of the number of accesses per unit time and an access time slot of the group IP. That is, the group targeting system 200 may calculate the number of accesses per unit time based on a number of browser cookies, determine whether the IP corresponds to a home or a group, and further determine whether the group has a large scale or a small scale when the IP corresponds to the group. Second, the group targeting system 200 may determine the location of the group that uses the group IP. The group targeting system 200 may determine a region corresponding to the group IP as the location of the group, using a DB storing IP ranges and local units being mapped. As another example, the group targeting system 200 may determine, as the location of the group, location information of a mobile device used by a user belonging to the group. In detail, when the user who has logged in through the group IP based on a log-in cookie of the user logs in through the mobile device within a predetermine time, the group targeting system 200 may determine the location information of the mobile device as the location of the group. As another example, the group targeting system 200 may identify a mobile device that gained an access is through the group IP, thereby determining location information of the mobile device as the location of the group. Third, the group targeting system 200 may determine the business name of the group that uses the group IP. The group targeting system 200 may use a DB storing IP ranges and business names being mapped, in determining a business name corresponding to the group IP as the business name of the group. As another example, the business name may be determined from a local address corresponding to longitude and latitude values of the determined location information, that is, local information obtained by the second method above, using a map DB storing the longitude and latitude values and local addresses being mapped. Fourth, the group targeting system 200 may determine the business type of the group using a popular search term searched by the user of the group IP. That is, the group targeting system 200 may extract a popular search term set referenced in a particular IP, and determine the business type based on characteristics or a category of a frequent search terms referenced in only particular IP proxy. Here, the group targeting system 200 may determine the business type of the group, by excluding search terms overlapping with common popular search terms referenced in all IPs from popular search terms referenced in the particular IP and by determining a category of a search term having a high frequency in an IP proxy of the corresponding group but a low frequency as a whole. Accordingly, the group targeting system 200 may determine at least one characteristic among the scale, the location, the business name, and the business type of the group using a corresponding group IP, in operation 501.

Referring back to FIG. 4, in operation 430, the group targeting system 200 may perform targeting with respect to the group IP, using at least one of the scale, the location, the business name, and the business type of the group as a targeting factor of an advertisement related to the group. Here, the group targeting system 200 may provide a service or an is advertisement targeted to the popular search term searched by a user of the group IP or a user of the region including the group. In addition, the group targeting system 200 may provide a list of the group IPs and group characteristics per the group IP to the service platform or the advertisement platform. For an example, the advertisement platform may enable advertisers to perform bidding per individual group, using the group extracted in the IP range as a bidding option factor of the advertisers. Furthermore, the advertisement platform may exclude the group IP from objects of invalid click processing with respect to the advertisement. Also, the group targeting system 200 may provide IP information including the list of the group IPs and the group characteristics per the group IP to the advertisers through the advertisement platform, to induce the advertisers not to exclude the group IP from objects of advertising. For another example, the service platform may provide a targeted service using the group characteristics extracted from the IP group in the IP range.

According to the exemplary embodiments, an improved targeting structure may be achieved since a group IP is extracted from a range IP and targeting is performed with respect to a corresponding group. Also, according to the exemplary embodiments, since group targeting is performed by recognizing characteristics of a group, such as a scale, a business name, a business type, and the like of the group, effect of targeting may be optimized. In addition, the list of the group IPs extracted in the IP range and the group characteristics per the group IP may be utilized in various fields including bidding, reporting, charging, and the like related to a service or an advertisement.

The exemplary embodiments according to the present invention may be recorded in computer-readable media including program instructions to implement various operations embodied by a computer. The media may also include, alone or in combination with the is program instructions, data files, data structures, and the like. The media and program instructions may be those specially designed and constructed for the purposes of the present invention, or they may be of the kind well-known and available to those having skill in the computer software arts. The described file system may be recorded in a computer-readable recording medium.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A system for determining whether an Internet Protocol (IP) address belongs to an individual, defined as an individual IP, or whether the IP address belongs to a group of individuals, defined as a group IP, wherein the IP address consists of a plurality of digits that are divided into four sections, with each section including a plurality of digits, the system comprising:
   a storage device;
   a unit for receiving browser cookie information indicating the number of accesses to a website per unit of time from a plurality of browser cookies assigned to one or more computers associated with the IP address;
   an Internet protocol (IP) extraction unit stored at least in part on the storage device and configured to determine whether the IP address is a group IP address or an individual IP address based on both: (i) the browser cookie information, wherein the IP address is determined to potentially be a group IP address if the number of accesses per unit time is greater than or equal to a predetermined number, and the IP address is determined to potentially be an individual IP address if the number of accesses per unit time is less than the predetermined number; and (ii) whether the IP address is within a predetermined range of IP addresses saved within a database associated with the processor, wherein the predetermined range of IP addresses includes identical digits in the first three of the four sections, and further wherein the IP address is determined to be a group IP address if the IP address is within the predetermined range and the browser cookie information of (i) has led to the determination that the IP address is potentially a group IP address; and the IP address is determined to be an individual IP address if the IP address is not within the predetermined range, regardless of whether the browser cookie information of (i) has led to the determination that the IP address is potentially a group or potentially an individual IP address;
   wherein, when it has been determined that the IP address is a group IP address, the IP address is extracted as a group IP;
   a characteristic determination unit configured to determine characteristics of a group using the group IP that has been extracted, wherein the characteristics include location of the group, wherein the characteristic determination unit comprises a location determination unit configured to determine the location of the group, and further wherein the location determination unit determines a region corresponding to the group IP as the location of the group, using a database (DB) of IP ranges and local units mapped to the IP range, or determines location information of a mobile device used by a user belonging to the group as the location of the group; and
   a unit for performing click processing that is configured to process a first sub-set of clicks on an advertisement provided to the computer associated with the IP address as valid clicks and to process a second sub-set of clicks on the advertisement provided to the computer associated with the IP address as invalid clicks, but wherein the group IP is excluded from being processed as an object of invalid clicks with respect to the advertisement, thereby clicks associated with the group IP are processed as valid clicks with the first sub-set of clicks.

2. The system of claim 1, wherein the characteristic determination unit also comprises at least one of a scale determination unit configured to determine the scale of the size of the group using the group IP, a business name determination unit configured to determine the business name of the group, and a business type determination unit configured to determine the business type of the group.

3. The system of claim 1, wherein the characteristic determination unit also comprises a scale determination unit, and wherein the scale determination unit determines the scale of the size of the group based on at least one of the number of accesses per unit time and an access time slot of the group IP, and further wherein the scale of the group is divided into at least two sizes, defined as a large group and a small group.

4. The system of claim 1, wherein the location determination unit determines the location information of the mobile device as the location of the group when a user who has logged in through the group IP logs in through the mobile device within a predetermined time, or
determines the location information of the mobile device as the location of the group by identifying the mobile device that gained an access through the group IP.

5. The system of claim 2, wherein the business name determination unit determines a business name corresponding to the group IP as the business name of the group, using a DB of IP ranges and business names mapped to the IP range, or
determines the business name of the group from a local address corresponding to longitude and latitude values of the determined location information, using a map DB of the longitude and latitude values and local addresses mapped to the longitude and latitude value.

6. The system of claim 2, wherein the business type determination unit determines a business type of the group using a search term searched by a user of the group IP.

7. The system of claim 1, wherein:
the system further comprises a targeting unit configured to provide a targeted service or a targeted advertisement to the group according to the characteristics of the group determined by the characteristic determining unit; and
the targeting unit is configured to provide the targeted service and/or the targeted content according to a search term searched by a user of the group IP or a user of the region including the group.

8. The system of claim 1, wherein the group is used as a bidding option factor of an advertiser during bidding of an advertisement.

9. A method that uses a processor for determining whether an Internet Protocol (IP) address belongs to an individual, defined as an individual IP, or whether the IP address belongs to a group of individuals, defined as a group IP, wherein the IP address consists of a plurality of digits that are divided into four sections, with each section including a plurality of digits, the method comprising:
receiving, in the processor, browser cookie information indicating the number of accesses to a website per unit of time from a plurality of browser cookies assigned to one or more computers associated with the IP address;
determining, by the processor, whether the IP address is a group IP address or an individual IP address based on both: (i) the browser cookie information received during the receiving step, wherein the IP address is determined to potentially be a group IP address if the number of accesses per unit time is greater than or equal to a predetermined number, and the IP address is determined to potentially be an individual IP address if the number of accesses per unit time is less than the predetermined number; and (ii) whether the IP address is within a predetermined range of IP addresses saved within a database associated with the processor, wherein the predetermined range of IP addresses includes identical digits in the first three of the four sections, and further wherein the IP address is determined to be a group IP address if the IP address is within the predetermined range and the browser cookie information of (i) has led to the determination that the IP address is potentially a group IP address; and the IP address is determined to be an individual IP address if the IP address is not within the predetermined range, regardless of whether the browser cookie information of (i) has led to the determination that the IP address is potentially a group or potentially an individual IP address;
wherein, when it has been determined that the IP address is a group IP address during the step of determining whether the IP address is a group IP address or an individual IP address, the IP address is extracted, by the processor, as a group IP;
determining characteristics of a group that uses the group IP that has been extracted, wherein the characteristics include location of the group, wherein the determining includes determining the location of the group, and further wherein the determining includes either determining a region corresponding to the group IP as the location of the group, using a database (DB) of IP ranges and local units mapped to the IP range, or determining location information of a mobile device used by a user belonging to the group as the location of the group;
processing a first sub-set of clicks on an advertisement provided to the computer associated with the IP address as valid clicks;
processing a second sub-set of clicks on the advertisement provided to the computer associated with the IP address as invalid clicks, but wherein the group IP is excluded from being processed as an object of invalid clicks with respect to the advertisement, thereby clicks associated with the group IP are processed as valid clicks with the first sub-set of clicks, and
wherein a list of the group IPs or group characteristics per the group IP are provided to an advertiser.

10. The method of claim 9, wherein the determining also comprises determining the scale of the size of the group based on at least one of the number of accesses per unit time and an access time slot of the group IP, and further wherein the scale of the group is divided into at least two sizes, defined as a large group and a small group.

11. The method of claim 9, wherein the determining also comprises determining the business type of the group using a popular search term searched by a user of the group IP.

12. The method of claim 9, further comprising performing group targeting using the characteristics of the group,
wherein the performing of group targeting comprises providing a targeted service or a targeted advertisement according to a search term searched by a user of the group IP or a user of the region including the group.

13. The method of claim 9, wherein the group is used as a bidding option factor of an advertiser during bidding of an advertisement.

14. A non-transitory computer-readable recording medium storing an executable program, which comprises, when executed, the method of:

receiving browser cookie information indicating the number of accesses to a website per unit of time from a plurality of browser cookies assigned to one or more computers associated with the IP address;

determining whether the IP address is a group IP address or an individual IP address based on both: (i) the browser cookie information received during the receiving step, the number of accesses per unit time is greater than or equal to a predetermined number, wherein the IP address is determined to potentially be a group IP address if the number of accesses per unit time is greater than or equal to a predetermined number, and the and the IP address is determined to potentially be an individual IP address if the number of accesses per unit time is less than the predetermined number; and (ii) whether the IP address is within a predetermined range of IP addresses saved within a database associated with the processor, wherein the predetermined range of IP addresses includes identical digits in the first three of the four sections, and further wherein the IP address is determined to be a group IP address if the IP address is within the predetermined range and the browser cookie information of (i) has led to the determination that the IP address is potentially a group IP address; and the IP address is determined to be an individual IP address if the IP address is not within the predetermined range, regardless of whether the browser cookie information of (i) has led to the determination that the IP address is potentially a group or potentially an individual IP address; wherein when it has been determined that the IP address is a group IP address during the step of determining whether the IP address is a group IP address or an individual IP address, the IP address is extracted as a group IP;

determining characteristics of a group that uses the group IP that has been extracted, wherein the characteristics include location of the group, wherein the determining include determining the location of the group, and further wherein the determining includes either determining a region corresponding to the group IP as the location of the group, using a database(DB) of IP ranges and local units mapped to the IP range, or determining location information of a mobile device used by a user belonging to the group as the location of the group;

processing a first sub-set of clicks on an advertisement provided to the computer associated with the IP address as valid clicks;

processing a second sub-set of clicks on the advertisement provided to the computer associated with the IP address as invalid clicks, but wherein the group IP is excluded from being processed as an object of invalid clicks with respect to the advertisement, thereby clicks associated with the group IP are processed as valid clicks with the first sub-set of clicks.

* * * * *